UNITED STATES PATENT OFFICE.

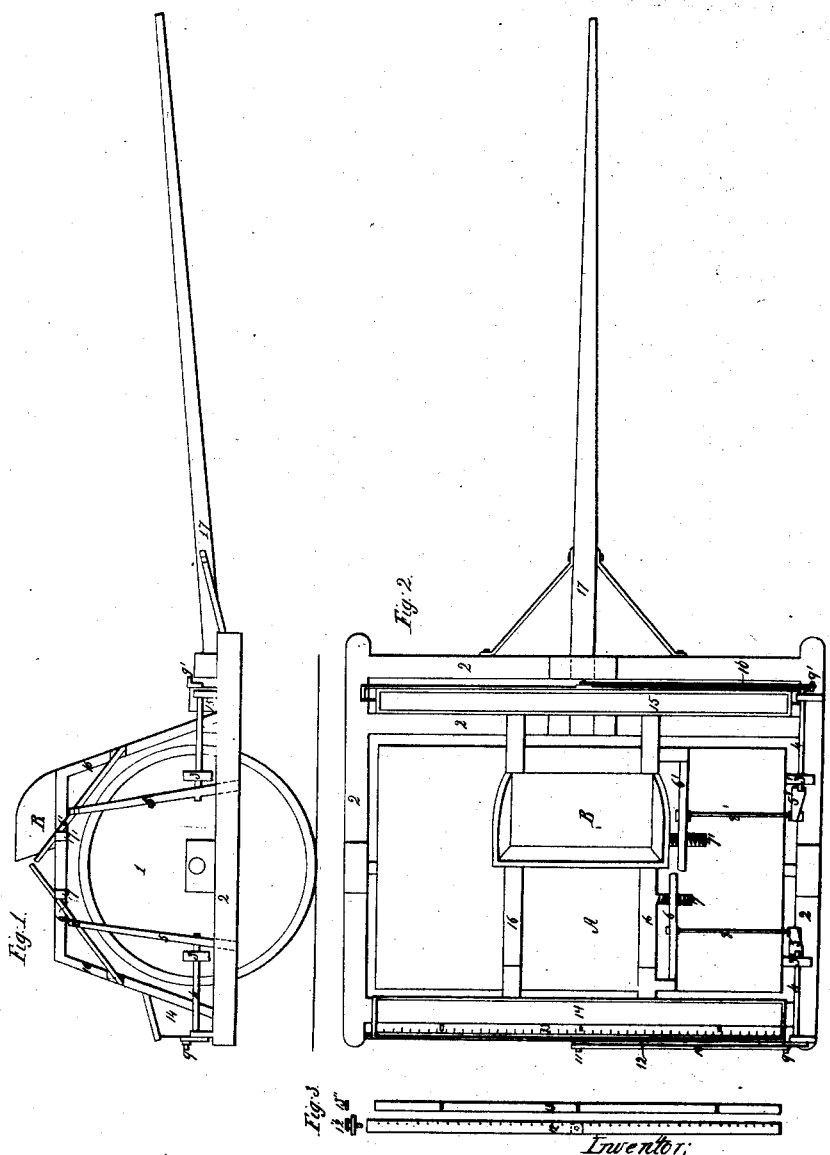

HENRY S. BABCOCK AND STILLMAN H. JENKS, OF IONIA, MICHIGAN.

PLASTER AND SEED SOWER AND ROLLER COMBINED.

Specification forming part of Letters Patent No. 45,686, dated January 3, 1865.

*To all whom it may concern:*

Be it known that we, HENRY S. BABCOCK and STILLMAN H. JENKS, of Ionia, in the county of Ionia, and State of Michigan, have invented a new and useful machine for sowing plaster and seed and rolling the land sowed at one and the same time, which we call a "Combined Plaster and Seed Sower and Roller;" and we do hereby declare that the following is a full, clear, and exact description of the construction and operation of the same, reference being had to the accompanying drawings, making part of this specification, in which—

Figure 1 represents an end view or elevation of the machine; Fig. 2, a top view of the same, and Fig. 3 detached view of adjustable bottom and reciprocating bar of plaster-sower.

Our invention consists, first, in the arrangement and combination of a plaster and seed sower with a land-roller, whereby the farmer is enabled to sow his seed, roll it in the ground, and sow it with plaster at the same time; and, secondly, in the construction of the plaster-sower with a reciprocating bar provided with a series of teeth or prongs moving laterally over a narrow aperture in the bottom of the plaster-box, extending from end to end thereof, by which prongs the plaster is agitated and distributed evenly over the ground.

To enable others skilled in the art to make and use our invention, we will proceed to describe its construction and operation.

A, Fig. 2, is a top view of the land-roller, which supports on its axle the frame 2, to which is attached the tongue 17, so as to be drawn by a pair of horses. On this frame, in front of the land-roller and parallel with it, is supported the seed-sower 15, which consists of a trough with a series of apertures in the bottom, which are opened and closed by a reciprocating bar or cord in such manner as to regulate and equalize the distribution of the seed on the ground as the machine passes over it, which reciprocating motion is communicated by the friction-roller 3 bearing against the head 1 of the land-roller A, and operating it by means of a crank, 9', and connecting-rod 10'. In rear of the land-roller and upon the frame is arranged the plaster-box 14, which is constructed with a metal bottom, 13, capable of adjustment so as to leave a suitable space between its edge and the side of the box for the distribution of the desired quantity of plaster. On the inside of the plaster-box extending from end to end is arranged edgewise a reciprocating metal plate, 12, to which are attached a number of prongs crossing the aperture in the bottom of the box and resting on the plate 13. Motion is communicated to this plate 12 by the rod 10 connecting the stub 11 with the crank 9, said crank being rotated by the friction-roller 3 bearing against the head of the land-roller.

The driver's seat B is supported on framework 16 above the land-roller, and in a convenient position on the right hand of the driver are arranged levers 6 6', by which, through connecting-rods 8 8' and levers 5 5', he has control of the seed and plaster sower to throw them in or out of gear at pleasure, and are held in the desired position by the ratchet-bars 7 7'.

Having thus described our invention, what we claim as new, and desire to secure by Letters Patent, is—

The plaster-box 14, having an unobstructed opening extending the whole length, the adjustable bottom plate, 13, and toothed reciprocating bar 12, in combination with the seed-sowing device and land-roller, the several parts being constructed and arranged substantially as and for the purpose set forth.

HENRY S. BABCOCK.
STILLMAN H. JENKS.

Witnesses:
E. R. POWELL,
JOHN H. MITCHELL.